(12) United States Patent
Zuercher et al.

(10) Patent No.: US 7,349,188 B2
(45) Date of Patent: Mar. 25, 2008

(54) ARC FAULT DETECTOR RESPONSIVE TO PATTERNS IN INTERVAL TO INTERVAL CHANGE IN INTEGRATED SENSED CURRENT VALUES

(75) Inventors: Joseph C. Zuercher, Brookfield, WI (US); Birger Pahl, Milwaukee, WI (US); Jerome K. Hastings, Sussex, WI (US)

(73) Assignee: Eaton Corporation, Cleveland, OH (US)

( * ) Notice: Subject to any disclaimer, the term of this patent is extended or adjusted under 35 U.S.C. 154(b) by 480 days.

(21) Appl. No.: 11/146,416

(22) Filed: Jun. 6, 2005

(65) Prior Publication Data

US 2006/0274460 A1 Dec. 7, 2006

(51) Int. Cl.
*H02H 3/00* (2006.01)

(52) U.S. Cl. .................................... 361/42
(58) Field of Classification Search .............. 361/42
See application file for complete search history.

(56) References Cited

U.S. PATENT DOCUMENTS

| 5,561,605 | A | 10/1996 | Zuercher et al. |
| 5,726,577 | A | 3/1998 | Engel et al. |
| 5,835,321 | A | 11/1998 | Elms et al. |
| 5,933,305 | A | 8/1999 | Schmalz et al. |
| 6,504,692 | B1 * | 1/2003 | Macbeth et al. .............. 361/42 |
| 6,577,138 | B2 | 6/2003 | Zuercher et al. |

* cited by examiner

*Primary Examiner*—Michael Sherry
*Assistant Examiner*—Scott Bauer
(74) *Attorney, Agent, or Firm*—Martin J. Moran

(57) ABSTRACT

An arc fault detector analyzes patterns in a sequence of counts of interval to interval increases or decreases in integrated current for patterns characteristic of arc faults. In AC systems, the interval can be a full cycle or in an alternative embodiment, the changes in integrated current for positive and negative half cycles are separately determined and then interleaved before the change counts are calculated. The count sequence is reset when patterns characteristic of phenomena other than an arc fault are detected to avoid nuisance trips.

20 Claims, 3 Drawing Sheets

ARC FAULT DETECTOR RESPONSIVE TO PATTERNS IN INTERVAL TO INTERVAL CHANGE IN INTEGRATED SENSED CURRENT VALUES

BACKGROUND OF THE INVENTION

1. Field of the Invention

Aspects of the invention are directed to apparatus that detects arc faults from characteristic disturbances in load current while avoiding unnecessary trips resulting from disturbances in load current caused by other phenomena.

2. Background Information

Arc fault detectors for use in AC and DC electrical power systems typically monitor load current for random disturbances characteristic of such faults. However, there are many "normal" events that can cause disturbances in load current that must be distinguished from arcs to avoid nuisance trips. Some of these events are: the interruption of load current by a thermal switch such as an electric iron, a waffle iron or a furnace thermostat, the operation of a dimmer, especially when the setting is being changed, capacitor run motors, the startup of a compressor, and many others.

Many techniques have been proposed for distinguishing arcing from other load current events. U.S. Pat. No. 5,933,305 uses a cyclic current integration comparison in which the integrated value of sensed current for repetitive time intervals, typically one cycle for AC systems, is compared with the value of the previous interval. For each time interval, indications of interval to interval increases and decreases in the integrated values for a selected number, such as six, of the most recent time intervals, are counted. If a weighted, time attenuated accumulation of the counts reaches a predetermined amount, the arc detection signal is generated, which can be used, for instance, to trip a circuit breaker.

There is room for improvement in arc fault detection, especially in meeting the performance described in Underwriter Laboratories Standard UL1699 relating to clearing time, nuisance tripping, masking of arcing events and multiple load testing. There is also the challenge of simplifying the technical approach, which can potentially reduce the cost of arc fault detectors.

SUMMARY OF THE INVENTION

Aspects of the invention are directed to an arc fault detector in which patterns in a sequence of counts of interval to interval increases or decreases in integrated current are analyzed for patterns characteristic of arc faults. The count sequence is reset when patterns characteristic of phenomena other than an arc fault are detected to avoid nuisance trips.

More particularly, aspects of the invention are directed to an arc fault detector for an electrical system comprising a sensed current signal generator generating from current flowing in the electrical system a sensed current signal. An integrator repetitively integrates the absolute value of the sensed current signal over equal time intervals to generate integrated sensed current values. A change indicator generates for each most recently completed time interval, a change indication when the integrated sensed current value for the most recently completed time interval changes by at least a threshold amount from the integrated sensed current value for the preceding time interval. A summer repetitively sums for each most recently completed time interval, the number of change indications generated over a selected number of the most recently completed time intervals to generate a change count. A memory stores the change counts for the selected most recently completed intervals in a sequence of change counts. A processor comprises detector means that generates an arc signal in response to patterns in the sequence of change counts indicative of an arc. The processor further includes reset means that clears the memory of the sequence of change counts in response to predetermined other patterns in the sequence of change counts indicative of events other than arc.

In one embodiment of the invention, the changes in integrated current for positive and negative half cycles are separately determined and then interleaved before the change counts are calculated.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
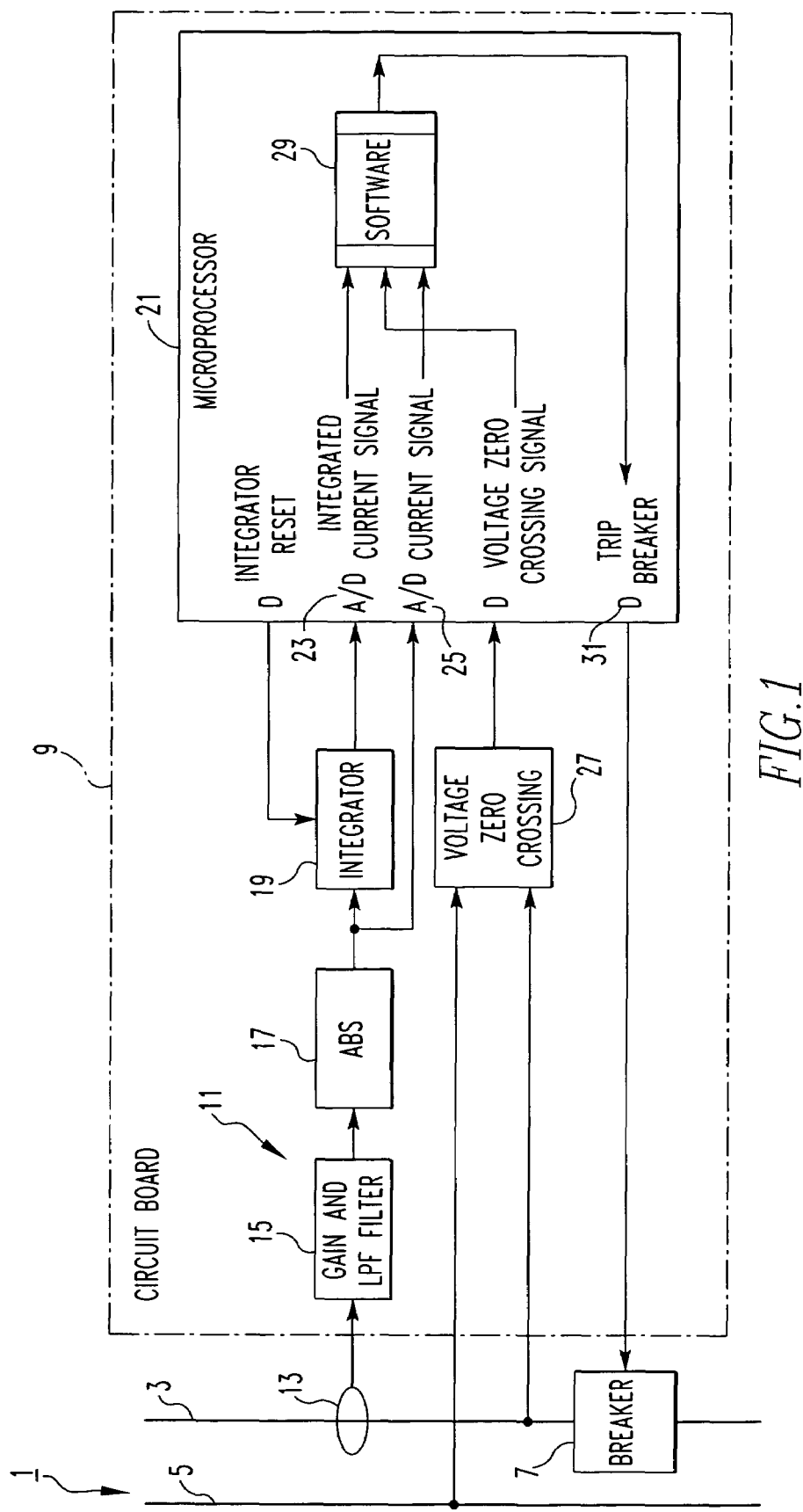
FIG. 1 is a block diagram of an arc fault detector in accordance with aspects of the invention.

As shown in FIG. 1, embodiments of the invention can be applied to detecting arc faults in an electrical system 1 that includes a line conductor 3 and a neutral conductor 5. The exemplary electrical system 1 is an AC system, typically a 50 or 60 hertz electric power distribution system. The electrical system 1 is protected by a conventional circuit breaker 7 that provides overcurrent and overload protection. In addition, an arc fault detector 9 provides protection against arc faults in the electrical system 1. Typically, the arc fault detector 9 would be incorporated into the circuit breaker 7; however, for clarity it is illustrated in FIG. 1 as being separate.

The arc fault detector 9 includes a signal generator 11 that includes a current transformer 13 coupled to the line conductor 3, a low pass filter 15 and an absolute value circuit 17. The current transformer 13 generates a sensed current signal, the low pass filter 15 filters the sensed current signal to prevent aliasing in subsequent digitation and the absolute value circuit 17 extracts the absolute value of the positive and negative half cycles of the sensed current signal.

The absolute value of the sensed current signal is repetitively integrated by an integrator 19. The arc fault detector 9 generates integrated sensed current values of the sensed current signal integrated over successive equal time intervals. For an AC electrical system, the time intervals are related to the frequency. In one embodiment of the invention, the time interval is a full cycle, 16.67 msec for a 60 hertz system or 20 msec for a 50 hertz system. In a second embodiment of the invention, the time interval is a half cycle. For DC electrical system, the time interval can be any arbitrary value, and for instance, could be in the range of the duration of the equal intervals for the exemplary AC systems.

While the integrations could be done fully in software, in the exemplary arc fault detector 9, the discrete integrator 19 is utilized to repetitively integrate the absolute value of the sensed current signal eight times per half cycle. The resultant integrated values are digitized by an analog-to-digital converter 23 within a microprocessor 21. As will be seen, these incremental integrations are summed over the selected time interval, e.g., one cycle or a half cycle. Such incremental integration increases the effective resolution of the analog to digital converter in the microprocessor by permitting its dynamic range to span only a portion of the selected time interval. The analog value of the absolute value of the sensed current signal is also digitized for input into the microprocessor 21 by another analog-to-digital converter 25 within the processor. This analog signal is sampled 16 times per half cycle.

The arc fault detector 9 also monitors the line-to-neutral voltage and a voltage zero crossing circuit 27 inputs the voltage zero crossings to the microprocessor 21 as a digital input. The digital processor resets the integrator 19 eight times per half cycle with the initial integration for each interval being synchronized by a voltage zero crossing. The microprocessor has software 29 that processes the integrated absolute sensed current values and the zero crossings, to detect the presence of an arc in the AC electrical system 1. Upon detection of such an arc, an arc signal is output at the digital output 31 that trips the circuit breaker 7 to interrupt current in the electrical system 1.

Figure 2:
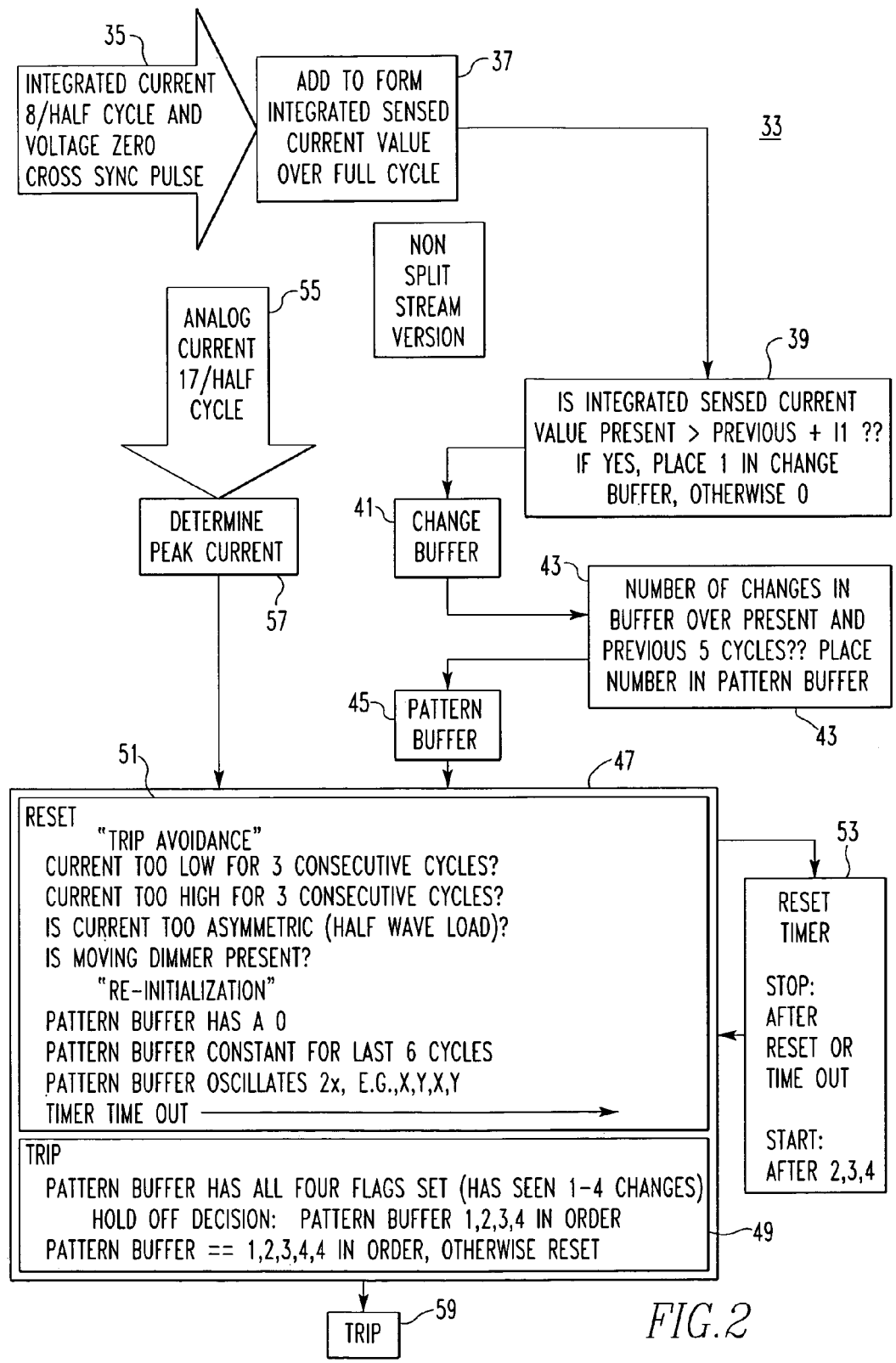
FIG. 2 is a flow diagram illustrating operation of the arc fault detector of FIG. 1 in accordance with one embodiment of the invention.

FIG. 2 is a flow diagram 33 for an embodiment of the invention in which the selected repetitive time interval is one cycle of the AC current. Hence, eight per positive half cycle and eight per negative half cycle integrations of sensed current (16 samples) input at 35 are added at 37 to generate the integrated sensed current value for the most recently completed cycle. This present integrated sensed current value for the most recently completed cycle is compared at 39 to the value for the previous cycle, plus a threshold or hysteresis value 11, which in the exemplary arc fault detector can have a value of about 1.5 A-msec. If this most recent integrated sensed current value is larger than the previous value, a "1" is placed in a change buffer 41, otherwise a zero is recorded in the buffer 41. The buffer 41 stores on a first in, first out basis the "1s" and "0s" for a selected number of most recent time intervals. In the exemplary arc fault detector, the selected number is six cycles. The comparison at 39 and the buffer 41 together form a change indicator, which maintains for the six most recent cycles the indications of increases and decreases in the integrated sensed current value over that for the previous cycle.

At 43, a summer calculates the number of changes in the buffer 41 over the selected number of cycles, again six cycles in the exemplary detector. In the exemplary system where a "1" is recorded for an increase above the threshold, and a "0" otherwise, a change is counted for each transition from a "0" to a "1" and from a "1" to a "0". Alternatively, a "1" can be recorded for each of an increase and a decrease in excess of the threshold value, and a "0" for no change, with the number of changes determined by adding the "1 s" for the most recently completed interval. However calculated, the count is stored in a memory in the form of a pattern buffer 45. This pattern buffer 45 is also a first in, first out buffer in which counts calculated at 43 from the change buffer 41 for the selected, e.g., six, most recently completed intervals, are stored as a sequence of change counts.

A processor routine 47 analyzes the sequence of change counts in the pattern buffer 45. This processor routine 47 includes an arc detector section 49 that looks for patterns in the sequence of change counts that are indicative of an arc fault. Essentially, the detector section 49 looks for randomness in the counts. The maximum number of counts that could be recorded between six intervals is five, and, of course, the minimum is zero. If five changes have been recorded, then the integrated sensed current value has changed between every interval, which is not indicative of randomness, and hence, of an arc fault. Obviously, a count of zero does not indicate, at least for that interval and the preceding five intervals, any random action. Hence, the detector section 49 in the exemplary arc fault detector looks for the occurrence of 1, 2, 3, and 4 changes as an indication of the randomness associated with an arc fault. These counts do not have to occur in order, nor do they have to occur consecutively or to have occurred in the last six intervals. Each time one of the number of counts is detected, a corresponding flag is set. When all four of the flags are set, an arc detection signal is generated. However, if the four counts are detected in sequence, that is, 1, 2, 3, 4, the decision is held off and an arc fault detection signal will only be generated if that sequence is followed by a repeat of the four count. In that case, a delayed arc fault signal will be generated.

The processor routine 47 also includes reset section 51, which clears the sequence of counts in the pattern buffer 45 and resets the flags. One condition under which the pattern buffer is reset is when the four counts are not detected within a selected time period established by a reset timer 53, which in the exemplary arc fault detector is about one second. The reset section 51 will also reinitialize the pattern buffer 45, that is set the pattern buffer to all zeroes, if a "0" appears in the buffer, as this indicates that there were no increases or decreases in excess of the threshold value in any of the last six intervals. In addition, the pattern buffer 45 is reinitialized if the count sequence remains constant over the last six cycles, i.e., the same count appears over the last six cycles. Also, the pattern buffer 45 is reinitialized if the count sequence oscillates two times, e.g., X, Y, X, Y.

The reset means 51 also includes "trip avoidance" rules which also reset the pattern buffer 45 to all zeros. In order to avoid trips in response to very low current phenomena, a reset is initiated if the integrated sensed current value is below a low current threshold, which in the exemplary system is about 44.5 A-msec. This avoids generation of an arc signal, and therefore tripping of the circuit breaker 7 in response to phenomena that do not pose any significant threat. The pattern buffer is also reset if the analog current is too high for three consecutive cycles, which is indicative of an inrush current associated with turn on of certain loads. In the exemplary system, this high current threshold is set at about 51 A rms of an equivalent sine wave. The analog current value is derived at 55 from the digital samples input to the microprocessor and is used to determine the peak current value at 57. In the exemplary detector, only the positive half cycles are digitized, at 16 samples per half cycle with an additional sample to make 17 samples in total.

Finally, a trip is avoided and the pattern buffer 45 is reset if a moving dimmer is detected. By moving dimmer it is meant a dimmer in which the setting is being either increased or decreased. As is known, a dimmer delays turn on a selected number of degrees after a zero crossing of the fundamental wave form. Such a moving dimmer is indicated by the integrated sensed current value increasing or decreasing over three consecutive integrations together with samples of the wave form after turn being indicative of a sine wave. In the exemplary arc fault detector, the latter is sensed by detecting that the $15^{th}$-$17^{th}$ samples of the analog current wave form values are typical of a sine wave, e.g., these values of current are more than minimal set fractions of the peak analog current.

When an arc fault signal is detected by the processor routine 47, a trip signal is generated at 59. The trip signal then trips the circuit breaker 7.

Figure 3:
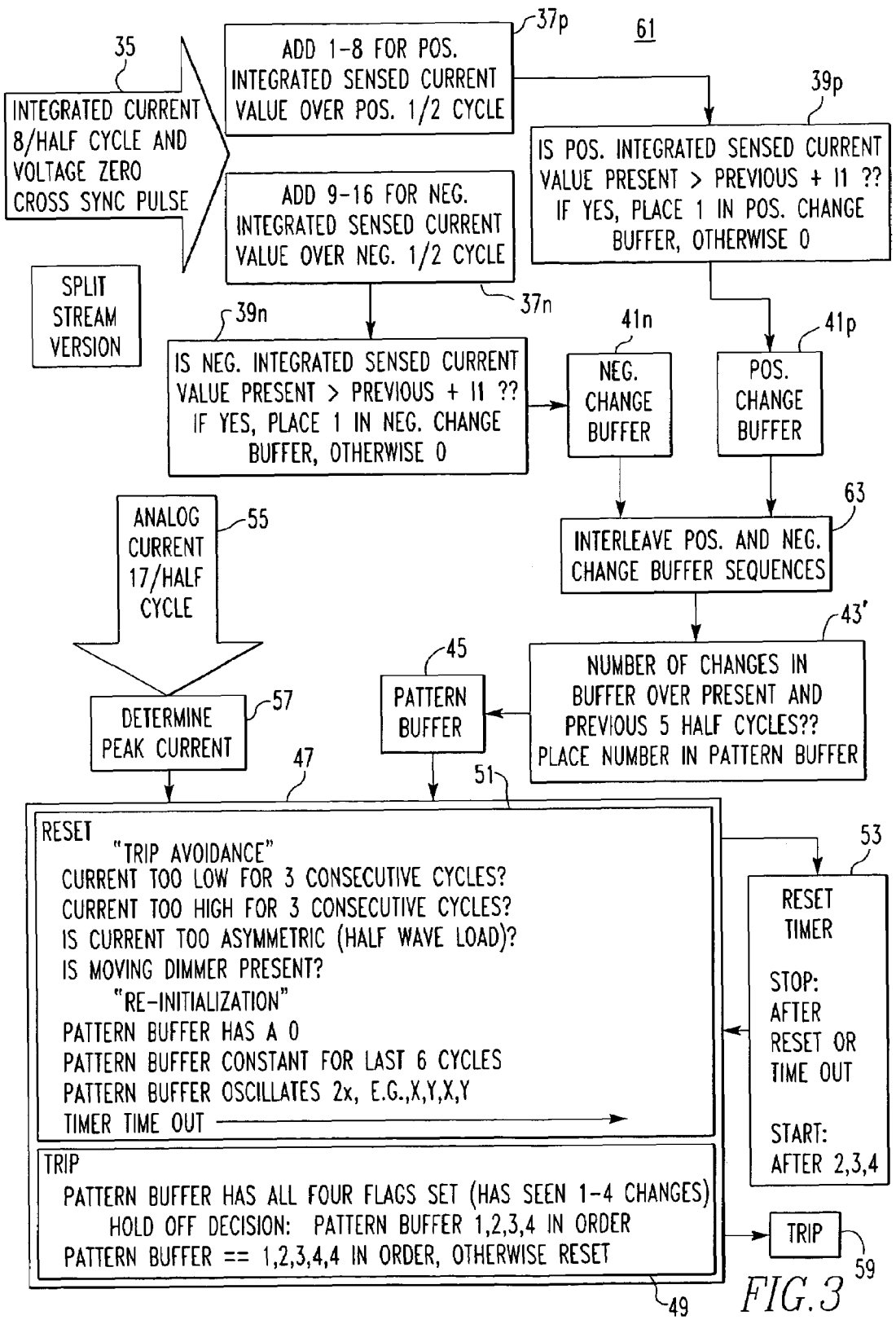
FIG. 3 is a flow chart illustrating operation of the arc fault detector of FIG. 1 in accordance with another embodiment of the invention.

In another embodiment of the invention, the sensed current is integrated separately over the positive half cycles and negative half cycles of current to generate positive half cycle integrated current values and negative half cycle integrated current values. A flow diagram 61 for this embodiment is illustrated in FIG. 3. This flow diagram differs from the diagram 33 in FIG. 2 in that the positive half cycles and negative half cycles of current are processed separately to detect cycle-to-cycle changes in the positive and negative half cycle integrated current values. Thus, as the half cycle integrated sensed current values are processed separately but similarly to the full cycle current in FIG. 3, the corresponding blocks are identified by the same reference character but with the suffix "p" and "n" for the positive and negative half cycles, respectively. As can be seen, change indications for the most recent three positive half cycles and negative half cycles are generated in the positive change buffer 41p and negative change buffer 41n. The change indications in these two buffers are then interleaved at 63 for the six most recent half cycles. That is, the change indications from the positive change buffer 41p and negative change buffer 41n are alternately entered into the new buffer. The number of changes in this buffer over the present and the previous five half cycles is then calculated at 43' and placed in the pattern buffer 45. The count changes for the last five half cycles (positive and negative, i.e., alternatively the last three positive and two negative or the last two positive and three negative) are analyzed by the processing means 47 in the same manner as the full cycle integration embodiment described in connection with FIG. 3.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault detector for an electrical system, the arc fault detector comprising:
    a sensed current signal generator generating from current flowing in the electrical system a sensed current signal;
    an integrator repetitively integrating an absolute value of the sensed current signal over equal time intervals to generate integrated sensed current values;
    a change indicator generating for each most recently completed time interval, a change indication when the integrated sensed current value for the most recently completed time interval changes by at least a threshold amount from the integrated sensed current value for the preceding time interval;
    a summer repetitively summing for each most recently completed time interval the number of change indications generated over a selected number of the most recently completed time intervals to generate a change count;
    a memory storing the change counts for the selected most recently completed intervals in a sequence of change counts; and
    a processor comprising:
        detector means generating an arc signal in response to patterns in the sequence of change counts indicative of an arc; and
        reset means clearing the memory of the sequence of change counts in response to predetermined other patterns in the sequence of change counts indicative of events other than an arc.

2. The arc fault detector of claim 1 wherein the detector means generates an arc signal in response to a pattern in the sequence of change counts comprising the presence of each of a plurality of specified change counts.

3. The arc fault detector of claim 2 wherein the memory stores the change count for the six most recently completed intervals to form the sequence of change counts and wherein the plurality of specified change counts is four.

4. The arc fault detector of claim 3 wherein the four different change counts comprise 1, 2, 3, and 4.

5. The arc fault detector of claim 4 wherein the detector means generates an arc fault signal when the change counts 1, 2, 3, and 4 appear in any order sequentially or non-sequentially within the sequence of change counts except the sequence 1, 2, 3, 4 unless followed by a change count of four.

6. The arc fault detector of claim 5 wherein the reset means comprises a timer that cleans the sequence of changes in the change court when the change counts 1, 2, 3, and 4 do not occur within a specified time period.

7. The arc fault detector of claim 1 wherein the reset means comprises a timer that initiates a time period in response to certain change counts in the sequence of change counts and that clears the sequence of change counts in the memory upon timing out of the time period.

8. The arc fault detector of claim 1 wherein the reset means clears the memory of the sequence of change counts in response to a first selected number of consecutive time intervals in which the integrated sensed current values are below a minimum value.

9. The arc fault detector of claim 1 wherein the reset means clears the memory of the sequence of change counts in response to a second selected number of consecutive time intervals in which the sensed current signal exceeds an inrush current value.

10. The arc fault detector of claim 1 wherein the reset means clears the memory of the sequence of change counts in response to a pattern in the sequence of change counts indicative of a moving dimmer.

11. The arc fault detector of claim 10 in which the pattern in the sequence of change counts indicative of a moving dimmer comprises a certain number of consecutive intervals in which the integrated sensed current values increase or decrease and the sensed current values approaching a zero crossing are indicative of a sine wave.

12. The arc fault detector of claim 1 wherein the reset means clears the memory of the sequence of change counts in response to certain repetitive patterns in the sequence of change counts.

13. The arc fault detector of claim 12 wherein the reset means clears the memory in response to a repetitive pattern within the sequence of change counts.

14. The arc fault detector of claim 12 wherein the reset means clears the memory in response to a repetitive pattern in a selected number of sequences of change counts.

15. The arc fault detector of claim 1 in which the reset means clears the memory in response to a zero in the sequence of change counts.

16. The arc fault detector of claim 1 wherein the electrical system is an AC electrically system and the time interval is a half cycle; the sensed current signal generator generates a positive half cycle sensed current signal and a negative half cycle sensed current signal; the integrator repetitively integrates an absolute value of the positive half cycle sensed current signal over each positive half cycle to generate positive half cycle integrated sensed current values and repetitively integrates an absolute value of the negative half cycle sensed current signal over each negative half cycle to generate negative half cycle integrated sensed current values; the change indicator comprises a positive half cycle change indicator generating for each most recently completed positive half cycle a positive half cycle change indication when the positive half cycle integrated current value for the most recently completed positive half cycle changes by at least the threshold amount from the positive half cycle integrated current value for the preceding positive half cycle and a negative half cycle change indicator generating for each most recently completed negative half cycle a negative half cycle change indication when the negative half cycle integrated current value for the most recently completed negative half cycle changes by at least the threshold amount from the negative half cycle integrated current value for the preceding negative half cycle, and means interleaving the positive half cycle change indications and the negative half cycle change indications to generate interleaved positive half cycle and negative half cycle change indications; and the summer repetitively sums for each most recently completed half cycle the number of interleaved positive half cycle and negative half cycle change indications generated over the predetermined number of positive half cycles and negative half cycles to generate the change count.

17. The arc fault detector of claim 16 wherein the reset means clears the memory of the sequence of counts in response to a pattern in the sequence of change counts indicative of a half wave load.

18. The arc fault detector of claim 17 wherein the pattern indicative of a half wave load in response to which the reset means clears the memory of the sequence of change counts comprises a plurality of consecutive integrated sensed current values above a first half wave value in one polarity half cycle and less than a second lower half wave value in the other polarity half cycle.

19. The arc fault detector of claim 1 wherein the electrical system is an AC electrical system and the time interval is one cycle.

20. The arc fault detector of claim 19 wherein the selected number of time intervals comprises six cycles.

* * * * *